United States Patent [19]

Shimizu et al.

[11] Patent Number: 4,587,022
[45] Date of Patent: May 6, 1986

[54] PROCESS FOR DEWATERING SLUDGE

[75] Inventors: Hideaki Shimizu; Eiichi Kofune; Haruhisa Saitoh; Katsuya Kobayashi, all of Kumagaya, Japan

[73] Assignee: Hitachi Metals, Ltd., Japan

[21] Appl. No.: 779,465

[22] Filed: Sep. 24, 1985

Related U.S. Application Data

[63] Continuation-in-part of Ser. No. 485,043, Apr. 14, 1983, abandoned.

[30] Foreign Application Priority Data

Apr. 15, 1982 [JP] Japan .................................. 57-61750

[51] Int. Cl.$^4$ ............................................. C02F 11/14
[52] U.S. Cl. .................................. 210/710; 210/770; 210/806; 210/808; 34/12
[58] Field of Search ............... 210/609, 710, 768, 769, 210/770, 806, 808, 225; 34/8, 12, 13; 48/197 A

[56] References Cited

U.S. PATENT DOCUMENTS

| 2,026,969 | 1/1936 | Flynn | 210/769 |
| 3,279,603 | 10/1966 | Busse | 210/769 |
| 3,802,089 | 4/1974 | Stephanoff | 34/8 |
| 4,193,206 | 3/1980 | Maffet | 210/769 |
| 4,237,618 | 12/1980 | Maffet | 34/12 |
| 4,244,287 | 1/1981 | Maffet | 34/12 |
| 4,398,476 | 8/1983 | Suzuki et al. | 201/27 |

FOREIGN PATENT DOCUMENTS 1318861  5/1973  United Kingdom ............... 210/770

Primary Examiner—Benoît Castel
Attorney, Agent, or Firm—Finnegan, Henderson, Farabow, Garrett & Dunner

[57] ABSTRACT

Sludge having a water content of less than 60% by weight is obtained by disintegrating primary dewatered sludge in a disintegrator to form sludge pieces having a layer of a dry dewatering additive while preventing the sludge from becoming like a slurry and then compressing the sludge pieces. The sludge thus obtained is combustible without requiring any further fuel.

15 Claims, 17 Drawing Figures (a)

(b)

(c)

PROCESS FOR DEWATERING SLUDGE

BACKGROUND OF THE INVENTION

This application is a continuation-in-part of application Ser. No. 485,043, filed Apr. 14, 1983, now abandoned.

FIELD OF THE INVENTION

This invention relates to a process for dewatering sludge of high water content such as sludge from sewage treatment, industrial waste water treatment, etc.

DESCRIPTION OF THE RELATED ART

Recently, such sludge has been produced in greater quantities, most of which is dumped in reclamation areas in the ocean or is combusted as an ultimate treatment. In the case of dumping sludge, there is a problem in that it tends to generate a disagreeable odor because it contains a lot of water and is putrescible. Furthermore, since the sludge to be dumped usually has large weight and volume, enormous costs are required for its transportation, procurement of dump sites, etc. For example, when sludge having a water content of 90% by weight (water content of sludge in percentage hereinafter will be based on weight unless specifically identified in other terms) is dewatered to a water content level of 80% to 50%, the weight of the sludge will be one-third to one-fifth, respectively. Thus, the lower the water content of sludge, the more economically and conveniently it can be handled.

In the case of combusting the sludge, enormous energy is required because of its high water content. For example, when one ton of organic sludge having a water content of about 75% is combusted, the amount of heavy oil required for combustion is 30–100 liters. The lower the water content of sludge, the less energy is necessary for combustion and the more economical is the process. Particularly for organic sludge containing combustible matter, if the water content of such sludge is reduced to below about 60%, fuel is required only for its ignition. After ignition, the sludge can be spontaneously combusted by its own calories.

Furthermore, when the water content of sludge is reduced to below about 45%, the sludge can serve as a fuel, and the heat generated by the combustion thereof can be utilized to produce hot water, etc.

The lower the water content of sludge, the more convenient its handling such as transportation, storing, etc., the longer a dump site can be used before reaching its full capacity, and the less fuel is required for combustion thereof. Thus, it is quite necessary to reduce the water content of sludge.

Generally, sludge is dewatered and solidified by adding an inorganic modifier such as slaked lime, iron chloride, etc. or an organic modifier such as a polymeric agglomerating agent, etc. to sludge, thereby forming an agglomerate of sludge, and dewatering it by a dehydrator, a centrifugal dehydrator, a vacuum dehydrator, a belt press, a filter press, etc., alone or in combination, thereby solidifying the sludge. The thus dewatered and solidified sludge is called "primary dewatered sludge." The primary dewatered sludge has a water content of about 70% to about 90%. The primary dewatered sludge obtained by a widely used dehydrator such as a belt press, filter press, etc. has a water content of about 70% to about 85%.

FIG. 1 shows the water content of organic sludge dewatered by the above-mentioned dehydrators, the amount of fuel (heavy oil A) necessary for combustion in a sludge combustion furnace, the water content of sludge which can be burned without supplying fuel in various sludge combustion furnaces and the water content of sludge serving as a heat resource.

To reduce the water content of the primary dewatered sludge from 70%–90% to a lower level, the primary dewatered sludge has been heretofore heated and dried or pressed under a high pressure. Heating and drying the sludge has disadvantages such as the consumption of large quantities of energy because of the low thermal conductivity of sludge, small gaps between sludge solids, small contact area with heating air, etc. On the other hand, pressing the sludge under a high pressure has disadvantages such as clogging of a filter. The sludge, when pressed, enters into the gaps of a cloth or paper filter and sticks to the entire surface of filter cloth, filter paper, etc. Thus, mere pressing of the primary dewatered sludge under a high pressure can hardly reduce the water content of sludge below 70%.

SUMMARY OF THE INVENTION

The object of the present invention is to provide a process for dewatering sludge to a water content level below 60%.

According to the present invention, the primary dewatered sludge is disintegrated into small pieces without being substantially vibrated or kneaded, a dewatering additive in a dry powder state is coated on the surfaces of the sludge pieces, and the sludge pieces are compressed, thereby dewatering the sludge to a water content of less than 60%.

The present process for dewatering sludge will be described in detail below, with reference to the drawings.

DESCRIPTION OF THE PREFERRED EMBODIMENT

Figure 1:
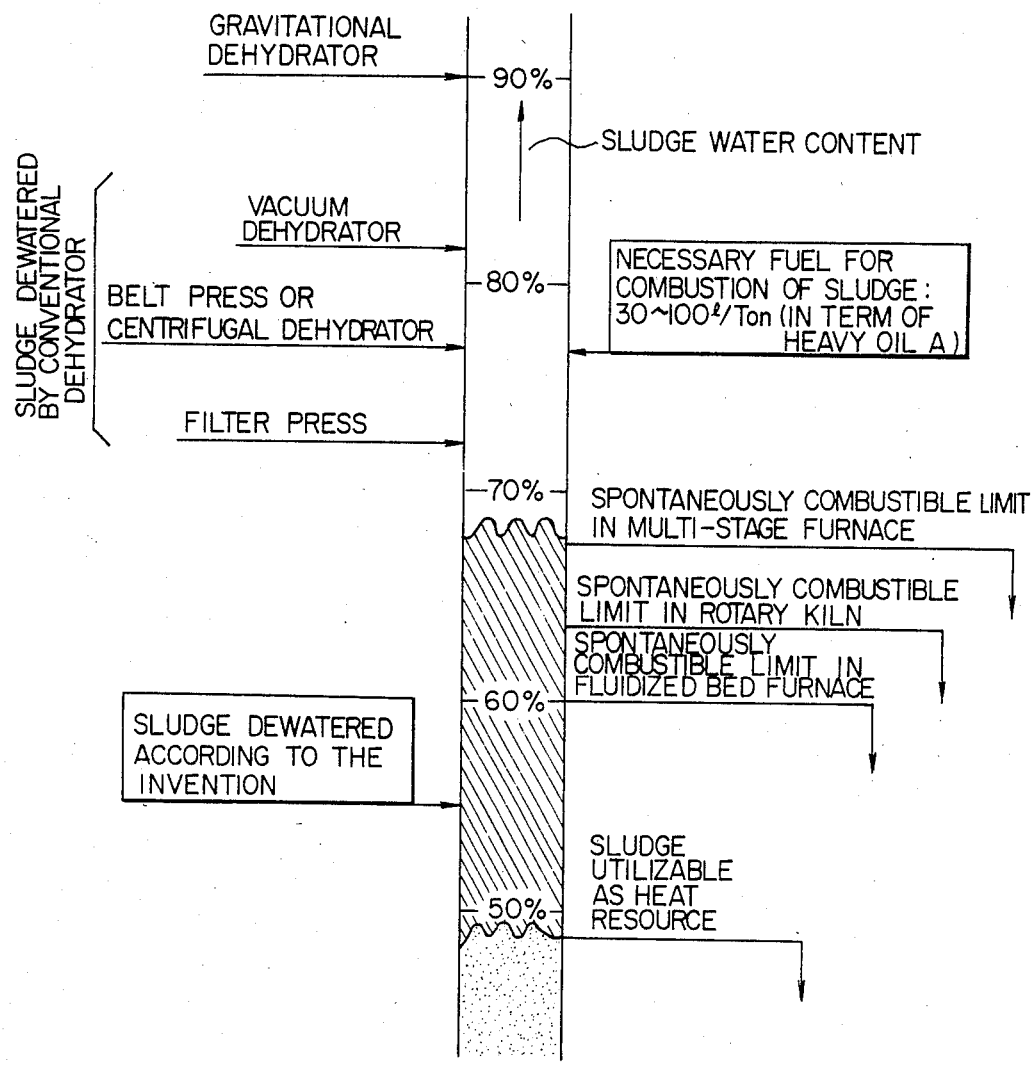
FIG. 1 shows various water content levels of sludge, the amount of fuel necessary for combustion of sludge, water content of spontaneously combustible sludge in various combustion furnaces, and the water content of sludge serving as a heat resource.
Figure 2:
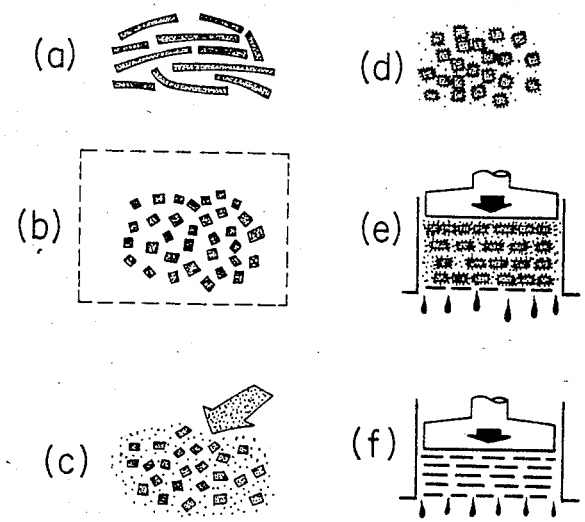
FIGS. 2(a) through 2(f) are schematic views of sludge in various steps of a process for dewatering sludge according to the present invention.

With reference to FIGS. 2(a) through 2(f), the first step of the process of the invention is to obtain primary dewatered sludge, as shown in FIG. 2(a), by use of a well known dehydrator such as a belt press, a filter press, a vacuum dehydrator, a centrifugal dehydrator, etc. The primary dewatered sludge then is disintegrated into small sludge pieces, as shown in FIG. 2(b), without substantially kneading the sludge. At the same time, a dewatering additive in a dry powder state is added, as shown in FIG. 2(c), to substantially coat the surfaces of the sludge pieces. As a result, a layer of the dewatering additive is formed on the sludge pieces, as shown in FIG. 2(d). The sludge pieces having such a layer of dewatering additive are called "conditioned sludge pieces." Actually, the conditioned sludge pieces can be prepared more easily by continuously charging the primary dewatered sludge and the dewatering additive into the sludge-disintegrating machine at the same time than by disintegrating the primary dewatered sludge into sludge pieces first and then adding the dewatering additive to the sludge pieces. However, the conditioned sludge pieces obtained by the latter procedure, i.e., by first disintegrating the primary dewatered sludge and then adding the dewatering additive, have an equal dewatering property. The dewatering property depends upon (1) the size of the conditioned sludge pieces, (2) the extent to which the sludge is kneaded or vibrated, (3) the type and amount of dewatering additive, and (4) the degree of uniformity of the dewatering additive layer on the sludge piece surfaces.

The sludge-disintegrating machine for preparation of the conditioned sludge pieces may be (1) a machine comprising a cylindrical rotary drum having small plates or rods projecting from the inner wall thereof; (2) a machine comprising a cylindrical rotary drum having small plates or rods projecting from the inner wall thereof and a rotary shaft equipped with disintegrating blades provided at a lower location within the drum, the drum and the shaft being rotated for disintegrating the sludge; or (3) a vibration-type disintegrating machine. Among the above-mentioned machines, machine (2) is preferable. To minimize the kneading or vibration of the primary dewatered sludge, it is preferable to cut the primary dewatered sludge into small pieces with sharp-edged blades.

Preferable dewatering additives for use in the present invention are dry powders that are insoluble in water and unbreakable under high pressure, for example, diatomaceous earth, gypsum, calcium carbonate, incineration ash, coal powder, bone meal, dried pulp, sawdust, and soil. These dewatering additives can be used alone or in combination. Incineration ash includes ash obtained by incinerating sludge from the treatment of sewage wastes, night soil, industrial waste water, garbage, industrial waste materials, etc. Incineration ash is readily available and very inexpensive, so it is very suitable as a dewatering additive. Recycled ash obtained by combusting sludge dewatered according to the present invention might be the most preferable dewatering additive.

The ratio of the weight of the dewatering additive to the dry weight of the primary dewatered sludge is in general 10–100% but can be greater than 100%. However, the desired ratio varies depending upon the piece-forming and dewatering properties of the primary dewatered sludge as well as upon the water content which the sludge is required to have after being secondarily dewatered. In most cases, the amount of dewatering additive added is 10–50% of the dry weight of the primary dewatered sludge.

Preferably, the size of conditioned sludge pieces is not substantially more than about 20 mm, and better dewatering can be achieved when at least 70% by weight of the conditioned sludge pieces have sizes ranging from 1 mm to 10 mm. Dewatering is most effective when the size of conditioned sludge pieces is within the range of 3 mm to 5 mm. If one tries to obtain a smaller size of sludge pieces without considering other factors, however, a disintegrating machine would be operated faster or longer, leading to the full kneading of the primary dewatered sludge. Under full kneading, the dewatering additive, once coated on the surfaces of the sludge pieces, enters into the sludge pieces. Once the dewatering additive enters into the sludge pieces, the corresponding amount of the additive on the sludge surfaces is lost, so the dewatering properties of the sludge pieces is lowered even if the size of the sludge pieces and the amount of the dewatering additive are within the above-mentioned preferred ranges. In addition, the full kneading breaks the inner structure of the sludge pieces which normally enables water to drain away from the sludge pieces under pressure. Thus, the primary dewatered sludge must be disintegrated into small pieces while preventing it from being fully kneaded and becoming like a slurry, thereby retaining the dewatering additive substantially on the surfaces of the sludge pieces. In practice, it is difficult to perform the disintegration and conditioning of the sludge in a rotary disintegrating machine without kneading the primary dewatered sludge at all. However, satisfactory sludge pieces can be obtained, for example, under the following operating conditions of a disintegrating machine of type (2) described above: (1) the cylindrical drum rotates at about 1–4 rpm, (2) the disintegrating blade shaft rotates at about 10–40 rpm, and (3) the operating time is about 20–40 seconds.

The next step of the process of this invention is to compress the conditioned sludge pieces, as shown in FIGS. 2(e) and 2(f), to produce secondary dewatered sludge having a water content of less than 60%.

The compression may be carried out by placing the conditioned sludge pieces between upper and lower filter cloths, each backed up by a thick perforated plate, and then compressing the pieces therebetween. The thick perforated plates are provided with a large number of pores each having a diameter of about 2–10 mm. The compression may be carried out in two steps, for example, by initially applying a predetermined pressure thereto over a predetermined time, and then applying a higher pressure over a predetermined time. Preferable compression pressure and time are about 30 kg/cm$^2$ or less, more preferably 15–25 kg/cm$^2$, during a period of 5 minutes for the initial compression step, and about 30–100 kg/cm$^2$, more preferably 30–70 kg/cm$^2$, over 5 minutes for the second compression step.

Test results relating to the present invention will be described in detail below.

Figure 3:
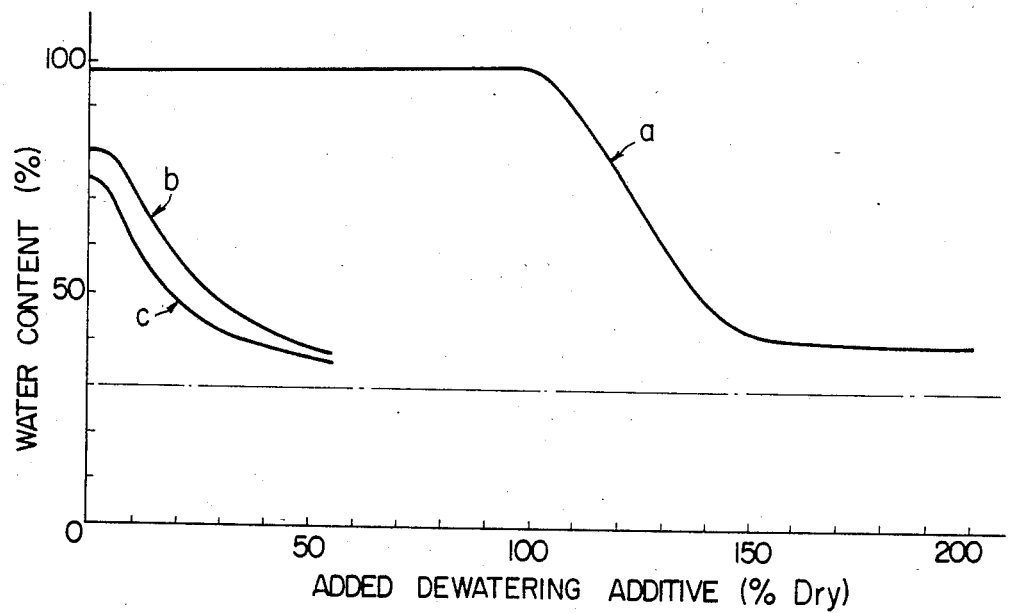
FIG. 3 is a graph showing the relationship between the amount of incineration ash added as a dewatering additive and the water content of the resulting secondary dewatered sludge.

FIG. 3 shows relationships between the amount of dewatering additive added and the water content of the resulting secondary dewatered sludge in cases where the primary dewatered sludge is subjected to secondary dewatering according to the present invention using the incineration ashes of sludge from sewage treatment as the dewatering additive.

When the water content of sludge before the secondary dewatering is about 98%, the water content of secondary dewatered sludge remains substantially on the same level when the amount of dewatering additive is below 100%, and no effect of secondary dewatering is observed, as shown by curve a in FIG. 3. It should be noted that the percentage of dewatering additive is based on the dry weight of sludge to be dewatered.

When secondary dewatering is carried out with the dewatering additive in the range of 100-150%, the water content of the secondary dewatered sludge decreases linearly to about 40% with the increase of the dewatering additive. If the dewatering additive exceeds 150%, the water content of the secondary dewatered sludge does not decrease further.

When the water content of sludge before the secondary dewatering, that is, the water content of primary dewatered sludge, is about 80%, the water content of secondary dewatered sludge is lowered to about 40% by adding about 50% of dewatering additive thereto, as shown by curve b in FIG. 3. The water content of secondary dewatered sludge substantially linearly decreases by adding up to about 30% of the dewatering additive.

When the water content of primary dewatered sludge is about 75%, a similar tendency is observed as shown by curve c in FIG. 3, but the water content of secondary dewatered sludge can be reduced to about 40% by the addition of only about 30% of dewatering additive.

As described above, when the sludge having a water content as high as 98% before the secondary dewatering is subjected to secondary dewatering, about 130% of dewatering additive is needed to reduce the water content to about 60%. On the other hand, when primary dewatered sludge having a water content of 75-80% is subjected to secondary dewatering according to the present invention, sludge having a water content of about 40% can be obtained by adding only 30-50% of dewatering additive thereto. It is thus advantageous to carry out primary dewatering as much as possible in order to do the secondary dewatering effectively. From the practical point of view, the primary dewatered sludge should have a water content of 85% or less, preferably 82-83% or less, in view of the capacity of the presently available disintegrators and the amount of dewatering additive needed.

Figure 4:
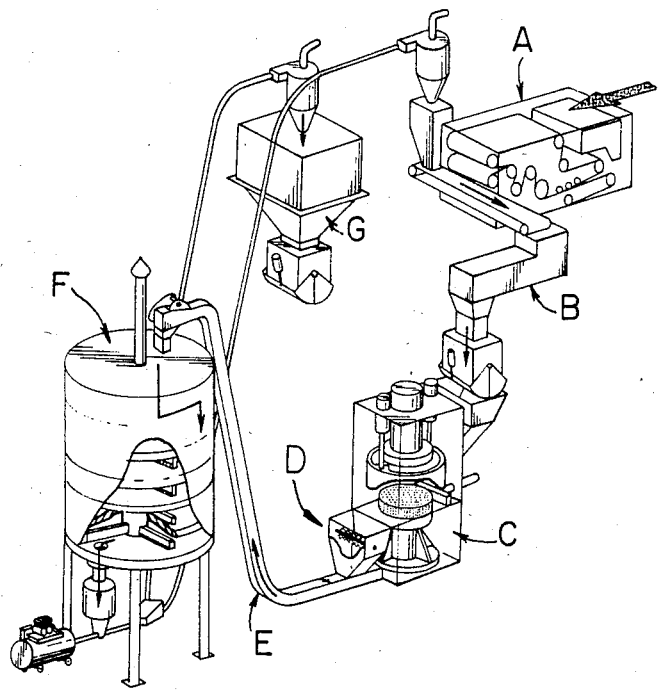
FIG. 4 is a schematic view of an apparatus for effecting the process of the present invention.

An apparatus for practicing the present invention will be described in detail below, with reference to FIG. 4.

Mud containing organic material and having a water content of about 95%, as precipitated on the bottom of a water path, a river, a precipitation pond, etc., is admixed with a polymeric agglomerating agent. The mud precipitated and concentrated by the addition of the agglomerating agent is supplied to a belt press A shown in FIG. 4 and is pressed between filter cloths on the belt press for primary dewatering. A sheet of primary dewatered sludge having a thickness of about 10 mm or less and a water content of about 74-78% is obtained. The primary dewatered sludge then is supplied to a disintegrating machine B, which comprises a rotatable cylindrical drum having small plates or rods projecting from the inner wall thereof and a rotatable shaft having disintegrating blades provided at a lower location in the drum. The disintegrating machine has a drum diameter of about 800 mm, a drum length of about 1,700 mm, a drum gradient of about 4/100, and is operated at about 2-3 rpm of drum rotation, at about 20-30 rpm of shaft rotation, and at charging rates of about 450 kg/hr primary dewatered sludge (not dry weight) and about 50 kg/hr dewatering additive. The dewatering additive comprises incinerator ash of sludge burned in a sludge incinerator multi-stage furnace F of FIG. 4. The amount of the dewatering additive, i.e., incineration ash, is by weight 50% of the dry weight of the primary dewatered sludge.

As described above, the primary dewatered sludge and the incineration ash are charged into the disintegrating machine B for disintegration and conditioning. The operating time of the disintegrating machine is about 20-40 seconds. However, if continuous disintegration and conditioning are desired, the disintegrating machine is constructed such that it is charged with them continuously and retains them for about 20-40 seconds, during which the disintegration and conditioning are performed. The thus conditioned sludge pieces are such that at least about 70% by weight thereof have a size of about 10 mm or less and their surfaces are substantially coated with incineration ash. They are not substantially kneaded so that their inner structure is not substantially destroyed.

The conditioned sludge pieces thus prepared in the disintegrating machine B then are supplied to a press C. The press C has a ram having a diameter of about 1 meter connected to a piston of a hydraulic cylinder for compressing the sludge by moving the piston downwardly. A thick perforated plate having a large number of pores each about 2 mm in diameter is provided on the bed of the press, and a filter cloth is laid on the bed. The conditioned sludge pieces are placed on the filter cloth. A thick cylindrical member having a slighlty larger inner diameter than the outer diameter (1 meter) of the ram is provided around the ram and is movable vertically on the press bed. The inner wall of the cylindrical member slidably engages the outer wall of the ram. A thick perforated plate is mounted on the lower end of the ram, and a filter cloth is provided on the lower side of the perforated plate. A batch of the conditioned sludge pieces is compressed between the press bed and the ram.

A filtrate produced by the compression is sucked out by a vacuum pump through the pores of the upper and lower perforated plates. The press compression may be carried out initially under a pressure of about 15 $kg/cm^2$ for about 45 seconds, and then under a higher pressure of about 30 $kg/cm^2$ for about 60 seconds. Such two-step compression of the conditioned sludge pieces produces a disc-shaped solid sludge having a water content as low as 45%.

Next, the disc-shaped sludge is disintegrated in a disintegrator D, and then is introduced into a multi-stage sludge incinerator F, through a conveyor E. A portion of ash produced by the combustion of the sludge in the incinerator F may be supplied to the disintegrating machine B through a pneumatically operable conveyor. The remainder of the ash is stored in an ash hopper G for subsequent disposal.

Figure 5:
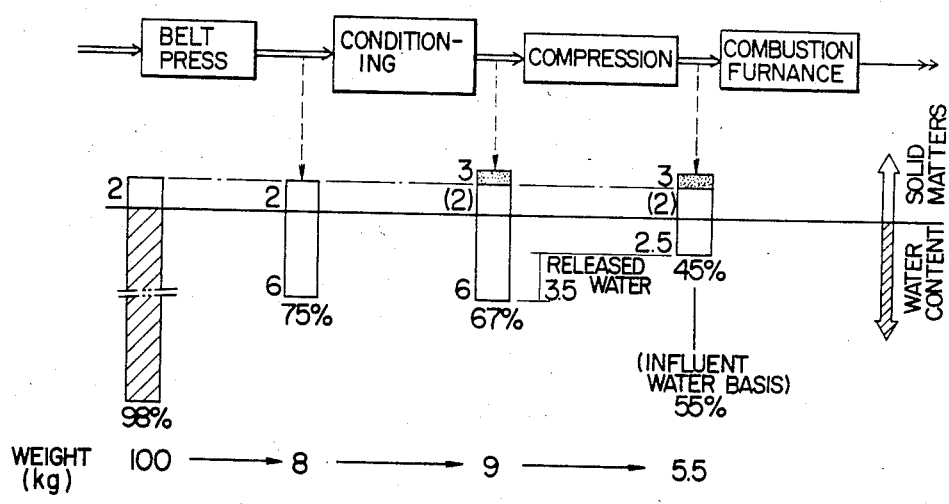
FIG. 5 is a schematic presentation of one of the effects attained according to the present invention.

The effects of the present process will be described below, with reference to FIG. 5. When 100 kg of organic sludge having the water content of 98% (thus containing 2 kg of sludge solids and 98 kg of water) is belt-pressed to provide primary dewatered sludge having a water content of 75%, the resulting primary dewatered sludge weighs 8 kg and consists of 2 kg of solid matter and 6 kg of water. Then, 1 kg of incineration ash (50% by weight of the solid matter of the primary dewatered sludge) is added to the primary dewatered sludge during the disintegrating step. The resulting conditioned sludge pieces weigh 9 kg and include 2 kg of sludge solids, 1 kg of dewatering additive, and 6 kg of water.

The conditioned sludge pieces then are compressed to obtain a 5.5-kg (2 kg sludge solids, 1 kg dewatering additive, and 2.5 kg water) secondary dewatered sludge having a water content of 45% (55% if the effect of the dewatering additive is discounted). The resulting water content is such that it permits the sludge to be burned without the addition of any fuel. Also, the reduced weight of the sludge facilitates its handling and permits the use of a smaller furnace for the combustion of the sludge.

Additional effects of the present process will be described below, with reference to FIGS. 6 and 7.

Figure 6:
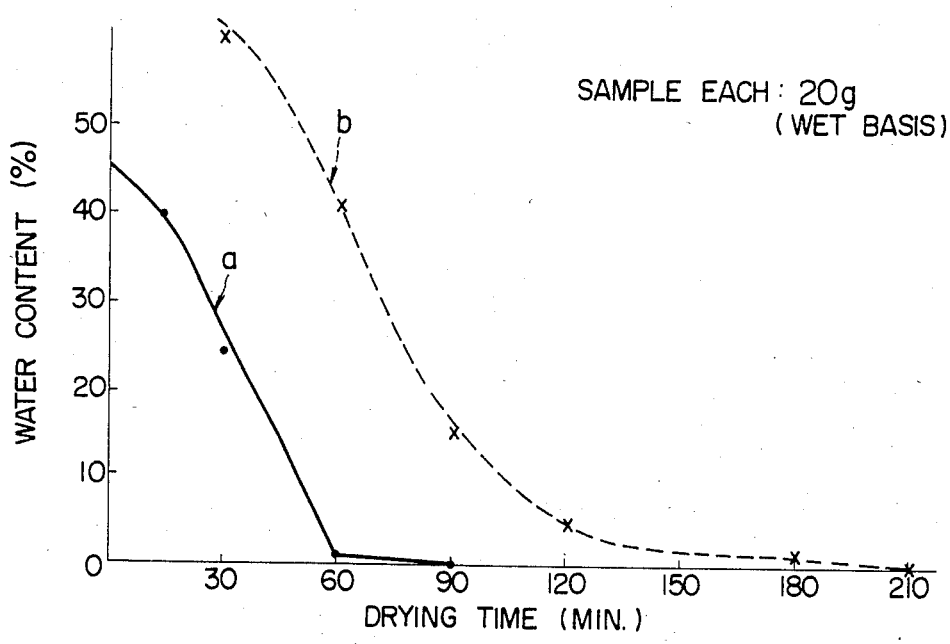
FIG. 6 is a graph showing drying characteristics of the secondary dewatered sludge obtained according to an embodiment of the present invention and the primary dewatered sludge obtained by a belt press.

FIG. 6 is a graph comparing the drying characteristics of secondary dewatered sludges obtained according to the present invention with those of primary dewatered sludge obtained by a belt press. Curve a shows the relationship between the time and the water content of secondary dewatered sludge having an initial water content of 45% when placed in a drying chamber at a temperature of 100° C.±5° C. Curve b shows the relationship between the time and the water content of primary dewatered sludge having an initial water content of 75% when placed in a drying chamber at a temperature of 100° C.±5° C. As is obvious from FIG. 6, the time required for reducing the water content of sludge from 40% to 0% is about 75 minutes for the secondary dewatered sludge and about 150 minutes for the primary dewatered sludge.

Figure 7:
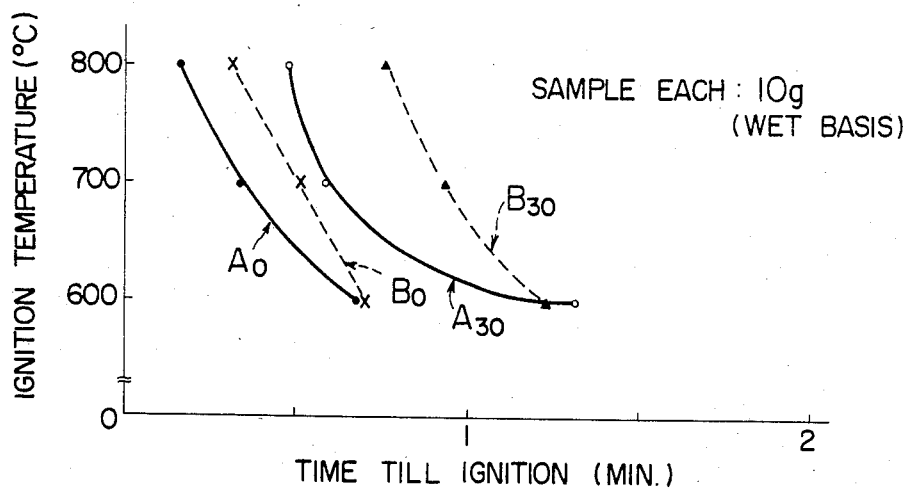
FIG. 7 is a graph showing ignition temperatures of the secondary dewatered sludge obtained according to an embodiment of the present invention and the primary dewatered sludge obtained by a belt press.

FIG. 7 is a graph comparing the ignition temperature of dried secondary dewatered sludge obtained according to the present invention with that of dried primary dewatered sludge obtained by a belt press. Curve $A_0$ shows the time required for igniting the dried secondary dewatered sludge having a water content of 0%, when exposed to atmospheres 800° C., 700° C., and 600° C., respectively. Naturally, the dried sludge is ignited more rapidly when exposed to higher temperatures. Curve $B_0$ shows the time required for igniting the dried primary dewatered sludge having a water content of 0% when exposed to 800° C., 700° C., and 600° C., respectively. Curves $A_{30}$ and $B_{30}$ show the time required for igniting the secondary and primary sludges dried to a water content of 30%, when exposed to atmospheres at 800° C., 700° C., and 600° C., respectively.

As is apparent from FIG. 7, the time required for igniting the secondary dewatered sludge dried by heating to a water content of 0% when exposed to 600° C. is about 42–43 seconds, and the dried primary dewatered sludge is also ignited in substantially the same time. Likewise, the time required for ignition at 600° C. is about 75–76 seconds for both the primary and secondary dewatered sludges dried to a 30% water content. When exposed to 700° C., however, the secondary dewatered sludge dried to a 0% water content is ignited about 10 seconds faster than the primary dewatered sludge also dried to a 0% water content. The same is true at 800° C.

As for sludge dried to a 30% water content, the secondary dewatered sludge is ignited about 20 seconds faster than the primary dewatered sludge when exposed to 700° C. or 800° C.

As described above, the secondary dewatered sludge according to the present invention is more easily dried and ignited than the primary dewatered sludge obtained by a belt press. Thus, an incinerator for combusting the secondary dewatered sludge of the invention may be smaller and operated faster than those for the primary dewatered sludge.

Further beneficial effects of the present invention will be described below. The sludge dried according to the present invention contains a very small amount of water and is not sticky, so it can be easily disintegrated or granulated. Because of such properties, it can be handled easily by a conveyor, a hopper, etc. Also, it can be burned without requiring any further fuel. In addition, it can be burned together with garbage in an incinerator. Further, since it does not have a disagreeable odor, it can be used for fertilizers, soil modifiers, reclamation soil, etc.

The dewatering mechanism of the present process will be described in detail below, with reference to FIG. 8.

Figure 8:
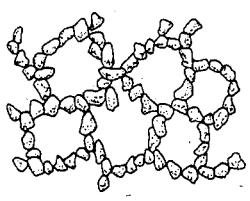
FIG. 8(a), 8(b), and 8(c) show bonding states of particles of primary dewatered sludge.
Figure 8:
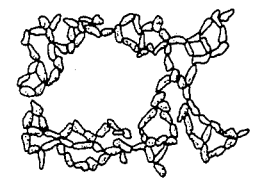
Figure 8:
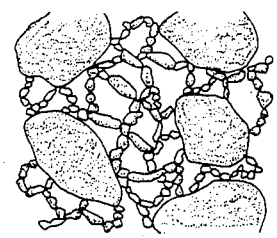
Figure 9:
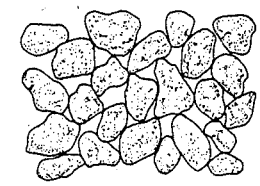
FIG. 9 shows a particle structure of primary dewatered sludge in a slurry-like flowable state.

FIG. 8 shows sludge particles of primary dewatered sludge bonded to each other. The sludge sedimented on the bottom of a settling tank or other sedimentation apparatus is subjected to primary dewatering after an agglomerating agent is added thereto, so that the sludge particles are mutually bonded by the action of the agglomerating agent. As shown by FIGS. 8(a), 8(b), and 8(c), the sludge particles are bonded to each other, forming a threedimensional network structure having internal clearances between sludge particles. These relatively wide clearances between the particles hold the water. FIG. 8(a) shows a honeycomb-like structure of sludge particles, FIG. 8(b) a flocky structure, and FIG. 8(c) a combination of a honeycomb-like structure and a flocky structure. This inner structure is destroyed when vibrated, stirred or kneaded, and the sludge becomes like a slurry, as shown in FIG. 9.

When primary dewatered sludge is compressed, the bonding structure of particles of sludge is deformed by the pressure, and the particles themselves are compressed and deformed. Thus, the clearances between the particles which retain the water are made narrower, so the water must be squeezed out through fine paths defined by the clearances between the sludge particles. Because the fine paths are also made narrow, the water in the sludge becomes less mobile. Thus, primary dewatered organic sludge cannot be dewatered by compression alone to a water content below 60–70%. An economical dewatering limit using compression has been found to be a water content of about 70%. However, when the primary dewatered sludge is cut into small pieces of about 5 mm in diameter and placed between filter papers and compressed, further dewatering can be achieved. On the other hand, if the primary dewatered sludge is stirred or vibrated into a slurry-like flowable state, then the sludge becomes sticky and clogs the filter even though the same treatment is performed thereon. Further dewatering is not possible.

In order to better understand the dewatering mechanism of the present invention, water permeability of materials will be considered. Water permeation rate Q (cm³/sec) of materials such as sludge, filter papers, incineration ash and sands, are represented as follows:

$$Q = k \cdot A \cdot \Delta h / l$$

wherein k=water permeability coefficient ($cm^3/cm^2$·sec)

A=cross-sectional area of the water-permeable layer ($cm^2$)

Δh=pressure difference between both sides of the water-permeable layer (cm)

l=thickness of the water-permeable layer (cm)

Generally, the water permeability coefficient is high for sands or other coarse particles, filter paper, etc., and low for clays and sludge. However, it also depends upon the clearances or gaps among particles and the configuration and arrangement of particles. Clays have a small permeability because they have small clearances between particles and large frictional resistance to water flow. Further, the water therein is considered to be viscous, unlike the water contained, for example, in a glass cup.

It is estimated that the water permeability coefficient is $10^{-3}$–$10^{-5}$ $cm^3/cm^2$·sec for filter papers, incineration ash, and diatomaceous earth, and $10^{-6}$ $cm^3/cm^2$·sec for sludge. That is, water is 10–1000 times more mobile in filter paper or incineration ash than in sludge. Also, when a uniform pressure is applied to a homogeneous soil layer, the time required for achieving the same water content generally is proportional to the square of the thickness of the soil layer.

Figure 10:
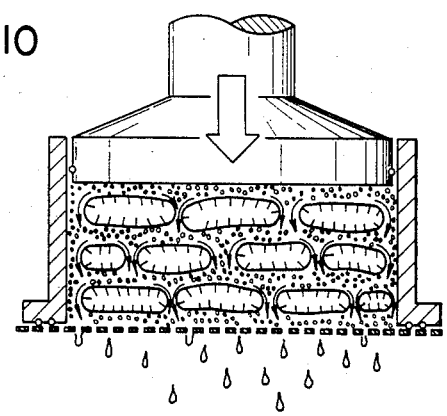
FIG. 10 is a schematic view showing the mechanism for secondary dewatering of sludge according to the present invention.

With the above in mind, the mechanism of secondary dewatering will be described below, with reference to FIG. 10. Note that, with respect to sludge, the term "water permeability" represents how easily the water contained in the sludge moves to the surface through sludge particle clearances or gaps, which may be called capillaries.

Sludge of poor water permeability is formed into a thin layer and disintegrated in accordance with the invention into small pieces about 2–5 mm in outer dimension. The small sludge pieces are coated with incineration ash of high water permeability to provide conditioned sludge pieces. When the conditioned small sludge pieces coated with incineration ash of high water permeability are compressed, the water in the small sludge pieces permeates through the naturally occurring particle clearances or internal capillaries of the sludge pieces and reaches the incineration ash coating layer. The water then moves faster through the incineration ash layer of high water permeability. Thus, the water is removed from the conditioned sludge pieces.

If the primary dewatered sludge is kneaded and then disintegrated, the water in the sludge pieces is hard to remove even if they are coated with ash. This is because, after substantial kneading, the naturally occurring internal capillaries of the sludge pieces are destroyed, and the sludge becomes like a slurry.

It is seen from the above that the secondary dewatering according to the present invention is more effectively carried out on the primary dewatered sludge obtained by a belt press or a filter press than that obtained by a centrifuge, because the filter press or the belt press does not substantially knead the sludge, while the centrifuge appears to knead the sludge to some extent.

The two-step compression is effective for the secondary dewatering, because the water passages of the incineration ash layer are less likely to be broken by such a process.

As described above, the present process can produce dewatered sludge having a water content of less than 60% by compressing primarily dewatered, conditioned sludge.

What is claimed is:

1. A process for dewatering sludge, comprising the steps of:
    dewatering said sludge to a water content of less than about 85% by weight;
    disintegrating said dewatered sludge in a disintegrating apparatus to form sludge pieces having an outer dimension of about 20 mm or less, the speed and operating time of said disintegrating apparatus being limited to prevent said disintegrated sludge from becoming like a slurry and to prevent the destruction of the naturally occurring inner structure of said sludge;
    conditioning said dewatered sludge by adding a dry dewatering additive thereto to form porous coatings of said additive on the surfaces of said sludge pieces while preventing a significant amount of said additive from being mixed into said sludge pieces, the amount of said additive being by weight at least about 10% of the dry weight of said sludge; and
    compressing said conditioned sludge pieces to force water within said sludge pieces to permeate out of said sludge pieces through clearances in said naturally occurring inner structure and to flow from said sludge pieces through passages in said porous coatings of said additive until the water content of said compressed sludge pieces is below 60% by weight.

2. The process according to claim 1, wherein said conditioning step includes adding said dewatering additive during said disintegrating step.

3. The process according to claim 1, wherein said conditioning step includes adding said dewatering additive after said disintegrating step.

4. The process according to claim 1, wherein said dewatering additive is selected from the group consisting of diatomaceous earth, gypsum, calcium carbonate, incineration ash, coal powder, soil, bone meal, sawdust, and dried pulp.

5. The process according to claim 4, wherein said dewatering additive is incineration ash.

6. The process according to claim 5, wherein said incineration ash is obtained by incinerating sludge from sewage treatment, night soil treatment, industrial waste water treatment, town refuse treatment, industrial waste treatment, or mixed ashes thereof.

7. The process according to claim 1, wherein the amount of said dewatering additive added in said conditioning step is by weight 10–100% of the dry weight of said sludge.

8. The process according to claim 1, wherein the amount of said dewatering additive added in said conditioning step is by weight 10–50% of the dry weight of said sludge.

9. The process according to claim 1, wherein at least 70% by weight of said sludge pieces have outer dimensions distributed in a range of 1–10 mm.

10. The process according to claim 1, wherein said compressing step includes a first compressing step carried out under a low pressure and a second compressing step carried out under a high pressure.

11. The process according to claim 10, wherein said first compressing step is carried out under a pressure of about 30 kg/$cm^2$ or less for a period of about 5 minutes and said second compressing step is carried out under a pressure of about 30–70 kg/cm² for a period of about 5 minutes.

12. The process according to claim 1, wherein said disintegrating apparatus includes blades having sharp edges to form said sludge pieces.

13. The process according to claim 1, wherein said sludge pieces are compressed between sheets of filter cloth in said compressing step.

14. The process according to claim 1, wherein said disintegrating step includes disintegrating said dewatered sludge in a disintegrating apparatus having a cylindrical rotary drum, a rotary shaft, small plates or rods fixed to the inner wall of said drum, and disintegrating blades fixed to said shaft.

15. The process according to claim 14, wherein said disintegrating step includes operating said disintegrating apparatus for about 20–40 seconds while rotating said drum at about 1–4 rpm and rotating said shaft at about 10–40 rpm.

* * * * *